(12) United States Patent
Varma et al.

(10) Patent No.: US 6,415,395 B1
(45) Date of Patent: *Jul. 2, 2002

(54) METHOD AND SYSTEM FOR PROCESSING REPAIR DATA AND FAULT LOG DATA TO FACILITATE DIAGNOSTICS

(75) Inventors: Anil Varma; Nicholas Edward Roddy, both of Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,612

(22) Filed: Apr. 2, 1999

(51) Int. Cl.$^7$ ................................................ G06F 11/00

(52) U.S. Cl. .............................. 714/37; 714/25; 714/26

(58) Field of Search ........................... 706/62; 714/100, 714/2, 25, 26, 29, 37, 40, 45, 47, 48, 57

(56) References Cited

U.S. PATENT DOCUMENTS

| | | | | |
|---|---|---|---|---|
| 4,062,061 A | * | 12/1977 | Batchelor et al. ............ | 364/900 |
| 4,322,813 A | * | 3/1982 | Howard et al. .............. | 364/900 |
| 5,127,005 A | | 6/1992 | Oda et al. ............... | 371/183.02 |
| 5,287,505 A | * | 2/1994 | Calvert et al. .............. | 395/600 |
| 5,463,768 A | | 10/1995 | Cuddihy et al. ......... | 395/183.13 |
| 5,596,712 A | * | 1/1997 | Tsuyama et al. ........ | 395/183.02 |
| 5,666,481 A | * | 9/1997 | Lewis .................... | 395/182.02 |
| 5,680,541 A | * | 10/1997 | Kurosu et al. .......... | 395/183.02 |
| 5,774,645 A | * | 6/1998 | Beaujard et al. ........ | 395/183.01 |
| 5,790,780 A | * | 8/1998 | Brichta et al. .......... | 395/183.22 |
| 5,799,148 A | | 8/1998 | Cuddihy et al. ......... | 395/183.02 |
| 5,845,272 A | | 12/1998 | Morjaria et al. .............. | 706/50 |
| 5,928,369 A | * | 7/1999 | Keyser et al. ................. | 714/47 |

OTHER PUBLICATIONS

"information processing", Encyclopedia Britannica Online. <http://www.search.eb.com/bol/topic?eu=109287@sctn=1> [accessed Sep. 28, 200.].*

"Error Log Analysis", IBM Technical Disclosure Bulletin, Nov. 1980, US, vol. 23, issue 6, pp. 2493–2504.*

Raaphorst et al., "Automated fault–tree generation of operational fault–diagnosis," IEE Conference on Electric Railways in United Europe, pp. 173–177, Mar. 1995.

Netten et al., "Large–scale fault diagnosis for on–board train systems," Delft University of Technology, Faculty of Technical Mathematics and Informatics, Knowledge Based Systems Group. Julianallaan 132, 2628 BL Delft, The Netherlands; University of Wales Swansea, Department of Electrical and Electronics Engineering, Singleton Park, Swansea SA2 8PP, United Kingdom, pp. 67–76.

* cited by examiner

Primary Examiner—Robert Beausoleil
Assistant Examiner—Gabriel Chu
(74) Attorney, Agent, or Firm—David C. Goldman; Jil M. Breedlove

(57) ABSTRACT

The present invention discloses a system and method for processing repair data and fault log data from one or more machines to facilitate analysis of a malfunctioning machine. The system includes a repair data storage unit comprising a plurality of repairs and a fault log data storage unit comprising a plurality of faults. A processor generates a plurality of cases from the repair data and the fault log data. Each case comprises a repair and a plurality of distinct faults. The processor further generates, for each of the plurality of cases, at least one repair and distinct fault cluster combination, and assigns, to each of the repair and distinct fault cluster combinations, a weight, whereby weighted repair and distinct fault cluster combinations facilitate prediction of at least one repair for the malfunctioning machine.

18 Claims, 10 Drawing Sheets

| CUST | UNIT | DATE | CODE | DESC | DESC1 | FAILMODE_DESC | SUB ASSEMBLY_ CODE | MAIN ASSEMBLY_ CODE |
|---|---|---|---|---|---|---|---|---|
| RR | 3500 | Sun Jul 13 1997 | 1111 | Piping Fittings-Eng Intercooler | REPAIRED WATER LEAK AT TOP OF RT | LEAKING FLUIDAIR | ENGINTCOOL | ENGINE |
| RR | 3500 | Tue Jul 01 1997 | 2222 | Lube Oil - Eng | WATER IN LUBE OIL CHANGED OIL | CONTAMINATED | LUBEOIL | ENGISUPT |
| RR | 3500 | Sat Jun 28 1997 | 3333 | BRP - Battery Charger Regulator Panel | NO BATTCHGE-REPL BRP | UNKNOWNUNDETERMIN | POWERPANEL | POWERELN |
| RR | 3500 | Wed Jun 18 1997 | 4444 | EFI - High Pressure Pump | REPLACE 3 HP PUMPS FOR NOT FIRING | UNKNOWNUNDETERMIN | ENGFUELINJ | ENGINE |
| RR | 3500 | Mon Jun 09 1997 | 5555 | Turbocharger Assembly - General - Eng | TURBO DRAGSSECONDARY DAMAGE-RPL | UNKNOWNUNDETERMIN | ENGTURBO | ENGINE |
| RR | 3500 | Sat May 24 1997 | 6666 | Cylinder Assembly - General - Eng | REPL R6 PA FOR SECONDARY DAMAGE | UNKNOWNUNDETERMIN | POWERASSY | ENGINE |
| RR | 3500 | Sat May 24 1997 | 7777 | Cylinder Assembly - General - Eng | TRIPPING COP PISTON FAILURE CO | UNKNOWNUNDETERMIN | POWERASSY | ENGINE |

FIG. 2

| 42 | 44 | 45 | 46 | | | 48 |
|---|---|---|---|---|---|---|
| RR | 3500 | 03-may-1997 | 1000 | 90623.06 | 90637.20 | 0.0 C S 0 1 2 0 101 97 R E O O ——————— Intake Manifold Air Too |
| RR | 3500 | 03-may-1997 | 2000 | 90623.06 | 90637.20 | 0.0 C S 0 1 2 0 101 97 R E O O ——————— Intake Manifold Air Too |
| RR | 3500 | 22-may-1997 | 3000 | 91067.93 | 91067.93 | 11.4 F 5 992 288 4706 202 177 182 M E F O 6 AB_M_S_ COP Trip |
| RR | 3500 | 22-may-1997 | 4000 | 91067.93 | 91067.93 | 11.4 F 5 992 288 4706 202 177 182 M E F O 6 AB_M_S_ COP Trip |
| RR | 3500 | 22-may-1997 | 5000 | 91068.70 | 91068.71 | 16.5 F 4 885 338 2864 133 175 186 M E 2 4 6 AB_M_S_ COP Trip |
| RR | 3500 | 22-may-1997 | 6000 | 91068.70 | 91068.71 | 16.5 F 4 885 338 2864 133 175 186 M E 2 4 6 AB_M_S_ COP Trip |
| RR | 3500 | 22-may-1997 | 7000 | 91068.71 | 0.00 | 17.9 F 1 458 6 0 0 174 186 R E F 4 E A B  Fault Reset While In Le |
| RR | 3500 | 22-may-1997 | 8000 | 91068.71 | 0.00 | 17.9 F 1 458 6 0 0 174 186 R E F 4 E A B  Fault Reset While In Le |
| RR | 3500 | 22-may-1997 | 9000 | 91069.55 | 91069.55 | 23.1 F 5 992 474 3005 148 180 187 M E 2 O R 6 AB_M_S_ COP Trip |
| RR | 3500 | 22-may-1997 | 1111 | 91069.55 | 91069.55 | 23.1 F 5 992 474 3005 148 180 187 M E 2 O R 6 AB_M_S_ COP Trip |
| RR | 3500 | 22-may-1997 | 2222 | 91069.56 | 91069.58 | 27.4 F 6 1010 506 2405 128 179 189 M E F 4 6 AB_M_S_ COP Trip |

FIG. 3

| RR_3500 | | 31-DEC-1997_2322-signatures | |
|---|---|---|---|
| RR_3500 | | 17-DEC-1997-DEC-1997 3 | |
| 7A5D | 3 | 20.4444 8 175 01 1112 2210.66 | |
| 7A4D | 2 | 0 1 168 170 1 0 | |
| 76D5 | 1 | 31.20000 8 176 203 1398 1866 | |
| DID NOT FIRE ON POP TEST | | | |

FIG. 5

| RR_3500 31-DEC-1997_2322-signatures_ones |
|---|
| 7A5D |
| 7A4A |
| 76D5 |

FIG. 6A

| RR_3500 31-DEC-1997_2322-signatures_twos |
|---|
| 7A5D  7A4A |
| 7A4D  76D5 |
| 7A4A  76D5 |

FIG. 6B

| RR_3500 31-DEC-1997_2322-signatures_threes |
|---|
| 7A5D  7A4A  76D5 |

2322_ones

| | |
|---|---|
| 778A | 1 |
| 7C89 | 1 |
| 7150 | 4 |
| 7A4A | 1 |
| 7151 | 1 |
| 7313 | 1 |
| 7A4C | 1 |
| 7152 | 1 |
| 7153 | 2 |
| 7154 | 5 |
| 7390 | 1 |
| 73A3 | 3 |
| 7C18 | 2 |
| 7C91 | 3 |
| 7C92 | 1 |
| 7C94 | 1 |
| 73AC | 1 |
| 7080 | 2 |
| 7404 | 1 |
| 7405 | 2 |
| 7081 | 1 |
| 7325 | 3 |
| 7A5D | 23 |
| 7082 | 2 |
| 7083 | 2 |
| 7407 | 1 |
| 7084 | 1 |
| 7085 | 1 |
| 7086 | 1 |
| 7484 | 1 |
| 7485 | 2 |
| 7487 | 1 |
| 7A62 | 3 |
| 7A63 | 1 |
| 7A67 | 1 |
| 76D5 | 24 |
| 7A68 | 1 |
| 748F | 2 |
| 7013 | 1 |

2322_twos

| | | |
|---|---|---|
| 7A5D | 76D5 | 20 |
| 7A5D | 7A4A | 1 |
| 7A4A | 76D5 | 1 |

2322_threes

| | | | |
|---|---|---|---|
| 7A5D | 7A4A | 76D5 | 1 |

120 all_ones

122 all_twos

124 all_threes

METHOD AND SYSTEM FOR PROCESSING REPAIR DATA AND FAULT LOG DATA TO FACILITATE DIAGNOSTICS

BACKGROUND OF THE INVENTION

The present invention relates generally to machine diagnostics, and more specifically, to a system and method for processing historical repair data and fault log data to facilitate analysis of a malfunctioning machine.

A machine such as locomotive includes elaborate controls and sensors that generate faults when anomalous operating conditions of the locomotive are encountered. Typically, a field engineer will look at a fault log and determine whether a repair is necessary.

Approaches like neural networks, decision trees, etc., have been employed to learn over input data to provide prediction, classification, and function approximation capabilities in the context of diagnostics. Often, such approaches have required structured and relatively static and complete input data sets for learning, and have produced models that resist real-world interpretation.

Another approach, Case Based Reasoning (CBR), is based on the observation that experiential knowledge (memory of past experiences—or cases) is applicable to problem solving as learning rules or behaviors. CBR relies on relatively little pre-processing of raw knowledge, focusing instead on indexing, retrieval, reuse, and archival of cases. In the diagnostic context, a case refers to a problem/solution description pair that represents a diagnosis of a problem and an appropriate repair.

CBR assumes cases described by a fixed, known number of descriptive attributes. Conventional CBR systems assume a corpus of fully valid or "gold standard" cases that new incoming cases can be matched against.

U.S. Pat. No. 5,463,768 discloses an approach which uses error log data and assumes predefined cases with each case associating an input error log to a verified, unique diagnosis of a problem. In particular, a plurality of historical error logs are grouped into case sets of common malfunctions. From the group of case sets, common patterns, i.e., consecutive rows or strings of data, are labeled as a block. Blocks are used to characterize fault contribution for new error logs that are received in a diagnostic unit.

For a continuous fault code stream where any or all possible fault codes may occur from zero to any finite number of times and where the fault codes may occur in any order, predefining the structure of a case is nearly impossible.

Therefore, there is a need for a system and method for processing historical repair data and fault log data, which is not restricted to sequential occurrences of fault log entries and which provides weighted repair and distinct fault cluster combinations, to facilitate analysis of new fault log data from a malfunctioning machine.

SUMMARY OF THE INVENTION

The above-mentioned needs are met by the present invention which provides in one embodiment a system for processing repair data comprising a plurality of repairs and fault log data comprising a plurality of faults from one or more machines to facilitate analysis of a malfunctioning machine. The system includes means for generating a plurality of cases from the repair data and the fault log data. Each case comprises a repair and a plurality of distinct faults. Generating means generates, for each of the plurality of cases, at least one repair and distinct fault cluster combination, and assigning means assigns, to each of the repair and distinct fault cluster combinations, a weight, whereby weighted repair and distinct fault cluster combinations facilitate prediction of at least one repair for the malfunctioning machine.

The assigning means for assigning a weight, for each repair and distinct fault cluster combination, may comprise dividing means for dividing the number of times the combination occurs in cases comprising related repairs by the number of times the combination occurs in the plurality of cases.

The system is also readily updated by including generating means for generating a new case from repair data and fault log data in which the new case comprises a repair and a plurality of distinct faults. Generating means generates, for the new case, a plurality of fault clusters for the plurality of distinct faults, and redetermining means redetermine a weight for each of the plurality of repair and distinct fault cluster combinations to include the new case.

BRIEF DESCRIPTION OF THE DRAWINGS

FIG. 2 is an illustration of a portion of repair log data;

FIG. 3 is an illustration of a portion of fault log data;

FIG. 5 is an illustration of a case generated according to the flowchart of FIG. 4;

FIGS. 6A–6C are illustrations of repair and fault cluster combinations for the case shown in FIG. 5;

FIGS. 8A–8C are illustrations of partial lists of single, double, and triple fault clusters for related repairs;

FIGS. 9A–9C are illustrations of partial lists of single, double, and triple fault clusters for related and unrelated repairs;

FIGS. 10A–10C are illustrations of partial lists of weighted repair and distinct fault cluster combinations.

DETAILED DESCRIPTION OF THE INVENTION

Figure 1:
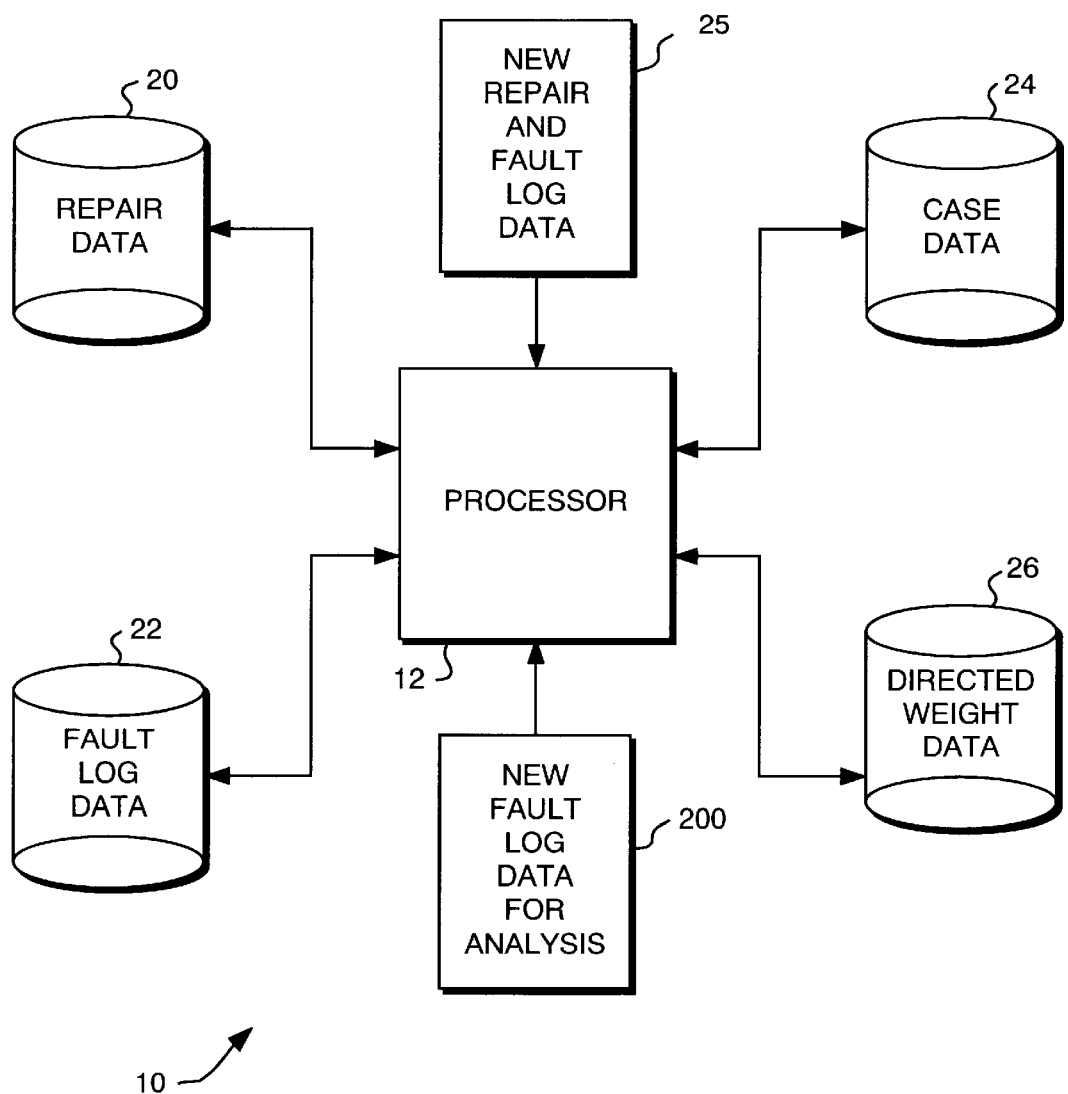
FIG. 1 is one embodiment of a block diagram of a system of the present invention for automatically processing repair data and fault log data from one or more machines and diagnosing a malfunctioning machine.

FIG. 1 diagrammatically illustrates one embodiment of a diagnostic system 10 of the present invention. In one aspect, system 10 provides a process for automatically harvesting or mining repair data comprising a plurality of related and unrelated repairs and fault log data comprising a plurality of faults, from one or more machines such as locomotives, and generating weighted repair and distinct fault cluster combinations which are diagnostically significant predictors to facilitate analysis of new fault log data from a malfunctioning locomotive.

Although the present invention is described with reference to a locomotive, system 10 can be used in conjunction with any machine in which operation of the machine is monitored, such as a chemical, an electronic, a mechanical, or a microprocessor machine.

Exemplary system 10 includes a processor 12 such as a computer (e.g., UNIX workstation) having a hard drive, input devices such as a keyboard, a mouse, magnetic storage media (e.g., tape cartridges or disks), optical storage media (e.g., CD-ROMs), and output devices such as a display and a printer. Processor 12 is operably connected to and processes data contained in a repair data storage unit 20 and a fault log data storage unit 22.

Repair data storage unit 20 includes repair data or records regarding a plurality of related and unrelated repairs for one or more locomotives. FIG. 2 shows an exemplary portion 30 of the repair data contained in repair data storage unit 20. The repair data may include a customer identification number 32, a locomotive identification or unit number 33, the date 34 of the repair, the repair code 35, a repair code description 36, a description of the actual repair 37 performed, etc.

Fault log data storage unit 22 includes fault log data or records regarding a plurality of faults occurring prior to the repairs for the one or more locomotives. FIG. 3 shows an exemplary portion 40 of the fault log data contained in fault log data storage unit 22. The fault log data may include a customer identification number 42, a locomotive identification number or unit 44, the date 45 that the fault occurred, a fault code 46, a fault code description 48, etc. Additional information may include various sensor readings, e.g., temperature sensor readings, pressure sensor readings, electrical sensor readings, engine power readings, etc. From the present invention, it will be appreciated by those skilled in the art that a repair data storage unit and a fault log data storage unit may contain repair data and fault log data for a plurality of different locomotives.

Figure 4:
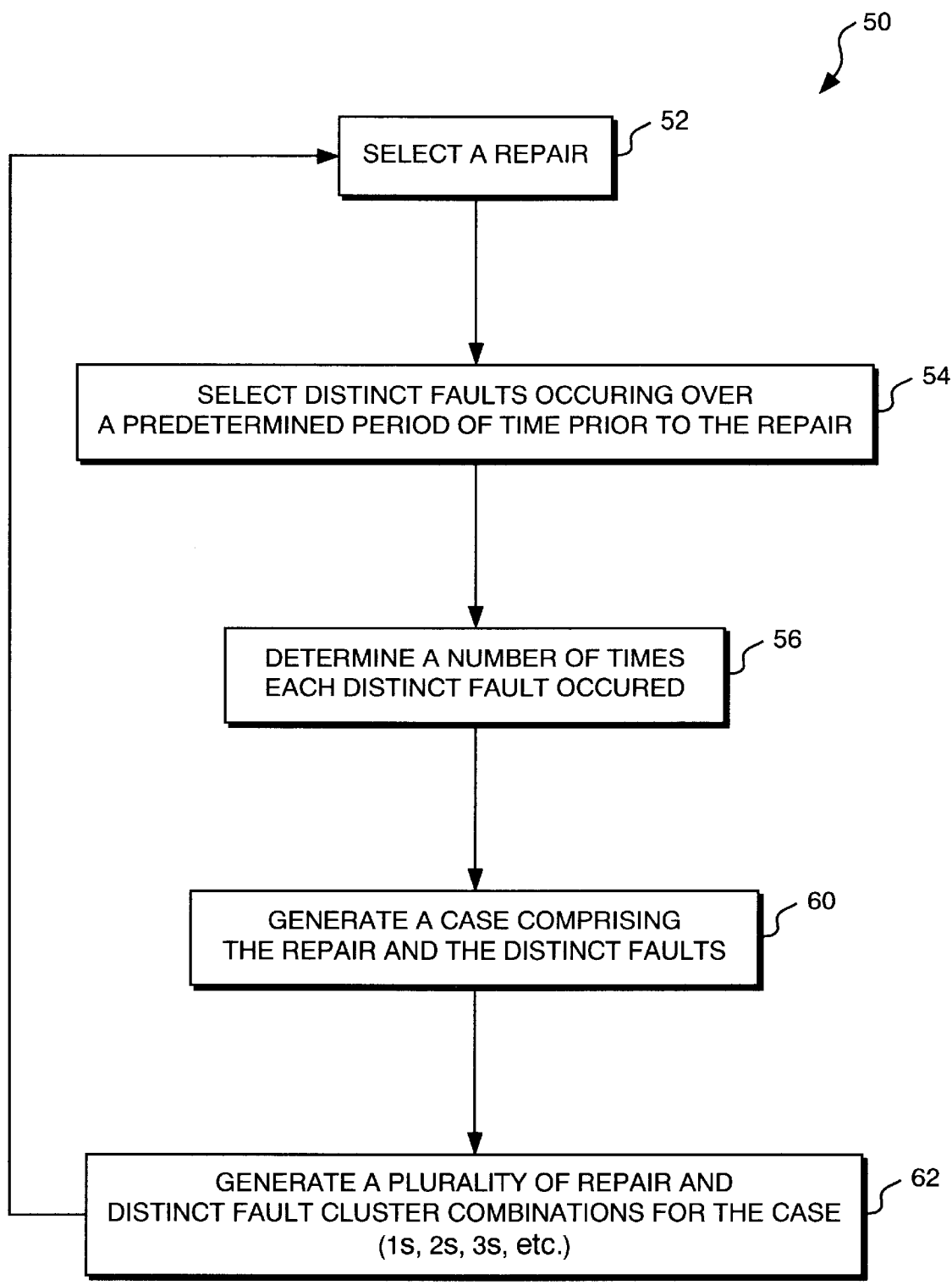
FIG. 4 is a flowchart describing the steps for generating a plurality of cases, and repair and fault cluster combinations for each case.

FIG. 4 is a flowchart of an exemplary process 50 of the present invention for selecting or extracting repair data from repair data storage unit 20 and fault log data from fault log data storage unit 22, and generating a plurality of diagnostic cases, which are stored in a case storage unit 24. As used herein, the term "case" comprises a repair and one or more distinct faults or fault codes. As also used herein, the term "distinct fault" is a fault or a fault code which differs from other faults or fault codes so that, as described in greater detail below, if the fault log data includes more than one occurrence of the same fault or fault code, the similarly occurring fault or fault code is identified only once.

With reference still to FIG. 4, process 50 comprises, at 52, selecting or extracting a repair from repair data storage unit 20 (FIG. 1). Given the identification of a repair, the present invention searches fault log data storage unit 22 (FIG. 1) to select or extract, at 54, distinct faults occurring over a predetermined period of time prior to the repair.

The predetermined period of time may extend from a predetermined date prior to the repair to the date of the repair. Desirably, the period of time extends from prior to the repair, e.g., 14 days, to the date of the repair. It will be appreciated that other suitable time periods may be chosen. Desirably, the same period of time is chosen for generating all of the cases. As will be appreciated further by the discussion below, it is the selection of distinct faults which is important and not the order or sequence of their arrangement in the fault log data.

At 56, the number of times each distinct fault occurred during the predetermined period of time is determined. A repair and the one or more distinct faults are generated and stored as a case, at 60.

FIG. 5 illustrates a case 70 generated by process 50 (FIG. 4). Exemplary case 70 comprises a file name 72 which lists, for example, a repair or repair code 2322 which corresponds to replacement of an electronic fuel injection pump, a customer identification number 74, a locomotive identification number or unit 76, a start date 78 and an end date 80 over which faults are selected, a listing of the distinct fault or fault codes 82 which occurred between start date 78 and end date 80, and the number of times each distinct fault or fault code occurred 84.

In this exemplary case 70, fault code 7A5D indicates that the locomotive diesel engine failed to reach full operating power, fault code 7A4A indicates an air conditioner compressor failed to start, and fault code 76D5 indicates a fault reset. Case 70 may also list additional information 86 such as various average sensor readings, e.g., average temperature sensor readings, average pressure sensor readings, average electrical sensor readings, average engine power readings, etc., for distinct faults 82.

With reference again to FIG. 4, at 62, repair and distinct fault cluster combinations are generated. For exemplary case 70 (FIG. 5), three repair code 2322 and single fault cluster (e.g., repair code 2322 and fault code 7A5D, repair code 2322 and fault code 7A4A, and repair code 2322 and fault code 76D5) combinations are illustrated in FIG. 6A. Three repair code 2322 and double fault clusters (e.g., repair code 2322 and fault codes 7A5D and 7A4A, repair code 2322 and fault codes 7A5D and 76D5, and repair code 2322 and fault codes 7A4A and 76D5) combinations are illustrated in FIG. 6B, and one repair code 2322 and triple fault cluster (e.g., repair code 2322 and fault codes 7A5D, 7A4A, and 76D5) combination is illustrated in FIG. 6C. From the present description, it will be appreciated by those skilled in the art that a case having a greater number of distinct faults would result in a greater number of repair and fault cluster combinations.

Process 50 is repeated by selecting another repair entry from the repair data to generate another case, and to generate a plurality of repair and fault cluster combinations. Case data storage unit 24 desirably stores a plurality of cases comprising related and unrelated repairs and a plurality of repair and distinct fault cluster combinations.

Figure 7:
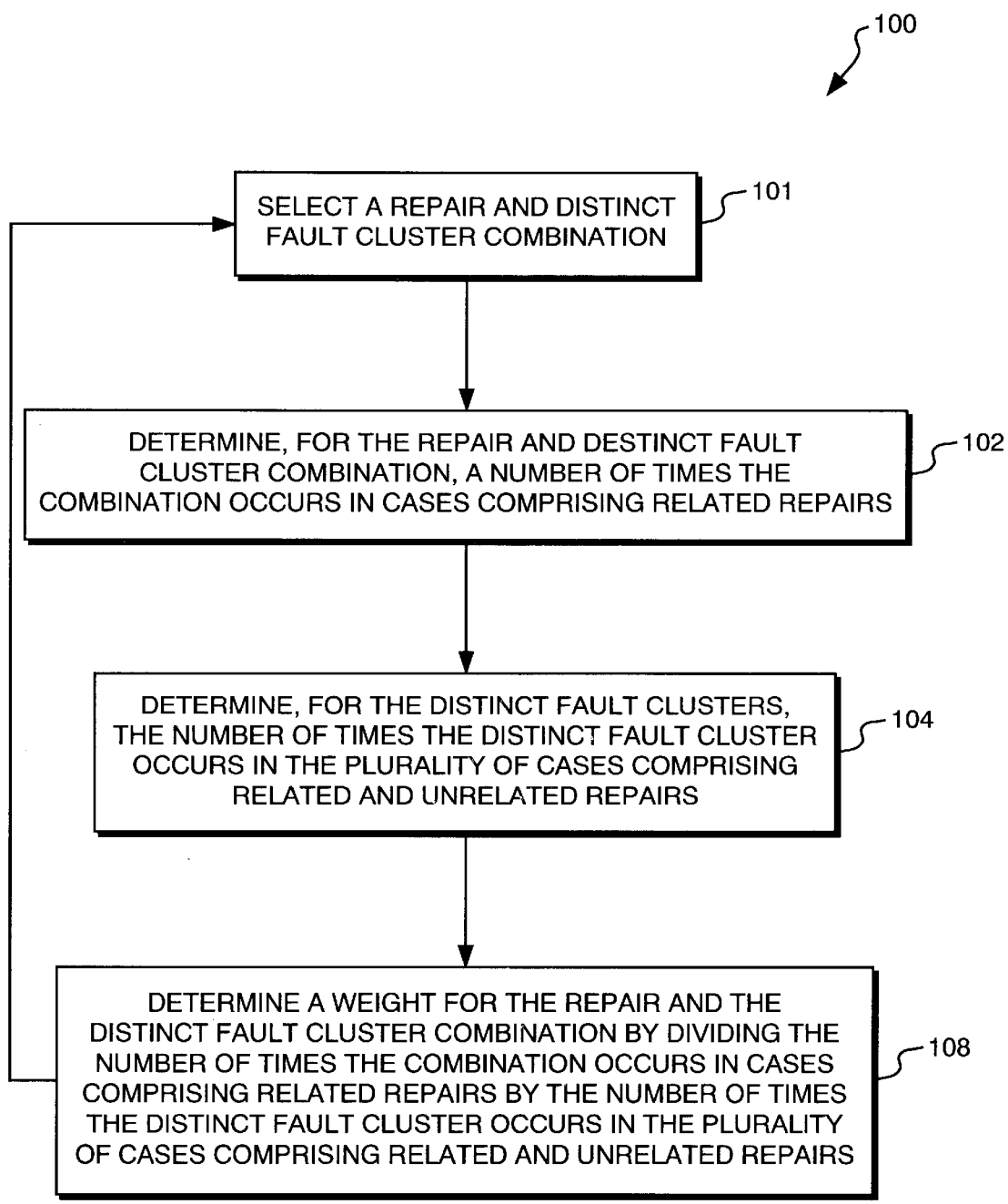
FIG. 7 is a flowchart describing the steps for determining a weight for each of the repair and fault cluster combinations.

FIG. 7 is a flowchart of an exemplary process 100 of the present invention for generating weighted repair and fault cluster combinations based on the plurality of cases generated in process 50. Process 100 comprises, at 101, selecting a repair and fault cluster combination, and determining, at 102, the number of times the combination occurs in cases comprising related repairs. The number of times the combination occurs in the plurality of cases of related and unrelated repairs, e.g., all repairs is determined at 104. A weight is determined at 108 for the repair and distinct fault cluster combination by dividing the number of times the combination occurs in cases comprising related repairs by the number of times the distinct fault cluster occurs in the plurality of cases comprising related and unrelated repairs.

Process 100 is further described in greater detail with reference to FIGS. 8–10 and exemplary case data storage unit 24 (FIG. 1) which contains, for example, 500 cases covering 60 different repairs in which 38 cases relate to repair code 2322.

FIG. 8A is a portion 110 of the plurality single fault clusters generated from the 38 cases in case data storage unit 24 related to repair code 2322. As shown in FIG. 8A, repair code 2322 and single fault cluster or fault code 76D5 combination occurred 24 times, repair code 2322 and single fault cluster or fault code 7A5D combination occurred 23 times, and repair code 2322 and single fault cluster or fault code 7A4A combination occurred once. Also observed are other fault codes which occurred in other cases involving repair code 2322.

FIG. 8B illustrates a portion 112 of the plurality of double fault clusters generated from cases in case storage unit 24 related to repair code 2322. As shown FIG. 8B repair code 2322 and double fault cluster or fault codes 7A5D and 76D5 combination occurred 20 times, repair code 2322 and double fault cluster or fault codes 7A5D and 7A4A combination occurred once, and repair code 2322 and double fault cluster or fault codes 7A4A and 76D5 occurred once. FIG. 8C illustrates a portion 114 of the plurality of triple fault clusters generated from cases in case storage unit 24 related to repair code 2322 in which repair code 2322 and triple fault cluster or fault 7A5D, 7A4A, and 76D5 combination occurred once.

For cases involving repair code 2322 and having distinct faults numbering greater than three (e.g., n), additional fault clusters of four, five, . . . , n, (not shown) are generated.

Figures 9A, 9B, 9C:
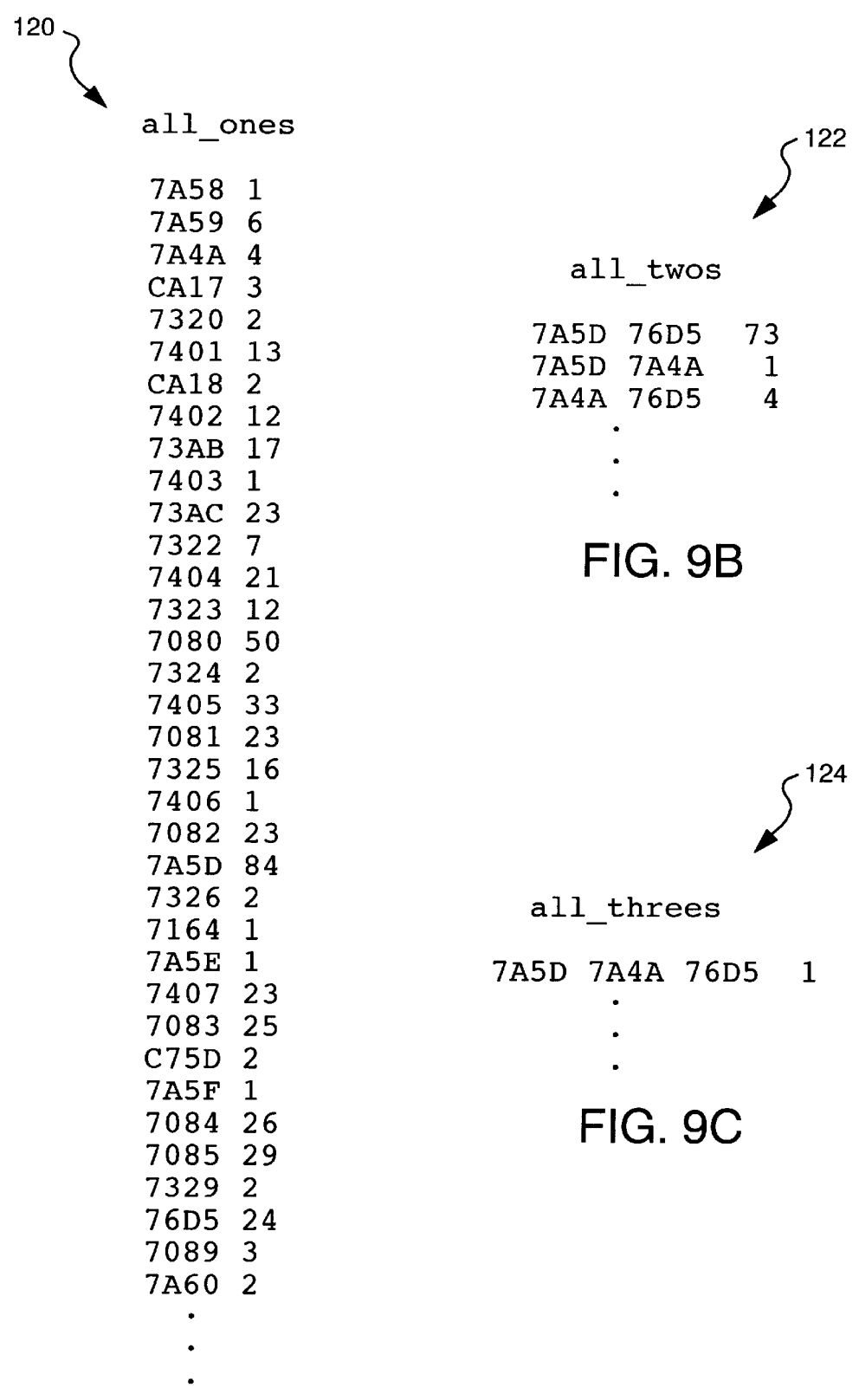

FIGS. 9A–9C are portions 120, 122, and 124, of the single, double, and triple fault clusters, respectively, generated from all of the plurality of cases (e.g., related and unrelated repairs) in case storage unit 24. As shown in FIG. 9A, single fault cluster or fault code 76D5 occurred in 24 out of all the cases, single fault cluster or fault code 7A5D occurred in 84 out of all the plurality of cases, and single fault cluster or fault code 7A4A occurred in 4 out of all of the plurality of cases.

As shown in FIG. 9B double fault cluster or fault codes 7A5D and 76D5 occurred in 73 out of all of the plurality of cases, double fault cluster or fault codes 7A5D and 7A4A occurred once out of all of the plurality of cases, and double fault cluster or fault codes 7A4A and 76D5 occurred once out of all of the plurality of cases.

As shown in FIG. 9C, triple fault cluster or fault codes 7A5D, 7A4A, and 76D5 occurred once out of all of the plurality of cases.

For cases having distinct faults numbering greater than three (e.g., n), additional fault clusters of four, five, . . . , n, (not shown) are generated.

Weighted repair and fault cluster combinations are determined and stored in a directed weight data storage unit 26. Partial listings of the weighted repair and fault cluster combinations are best shown in FIGS. 10A–10C.

Figures 10A, 10C:
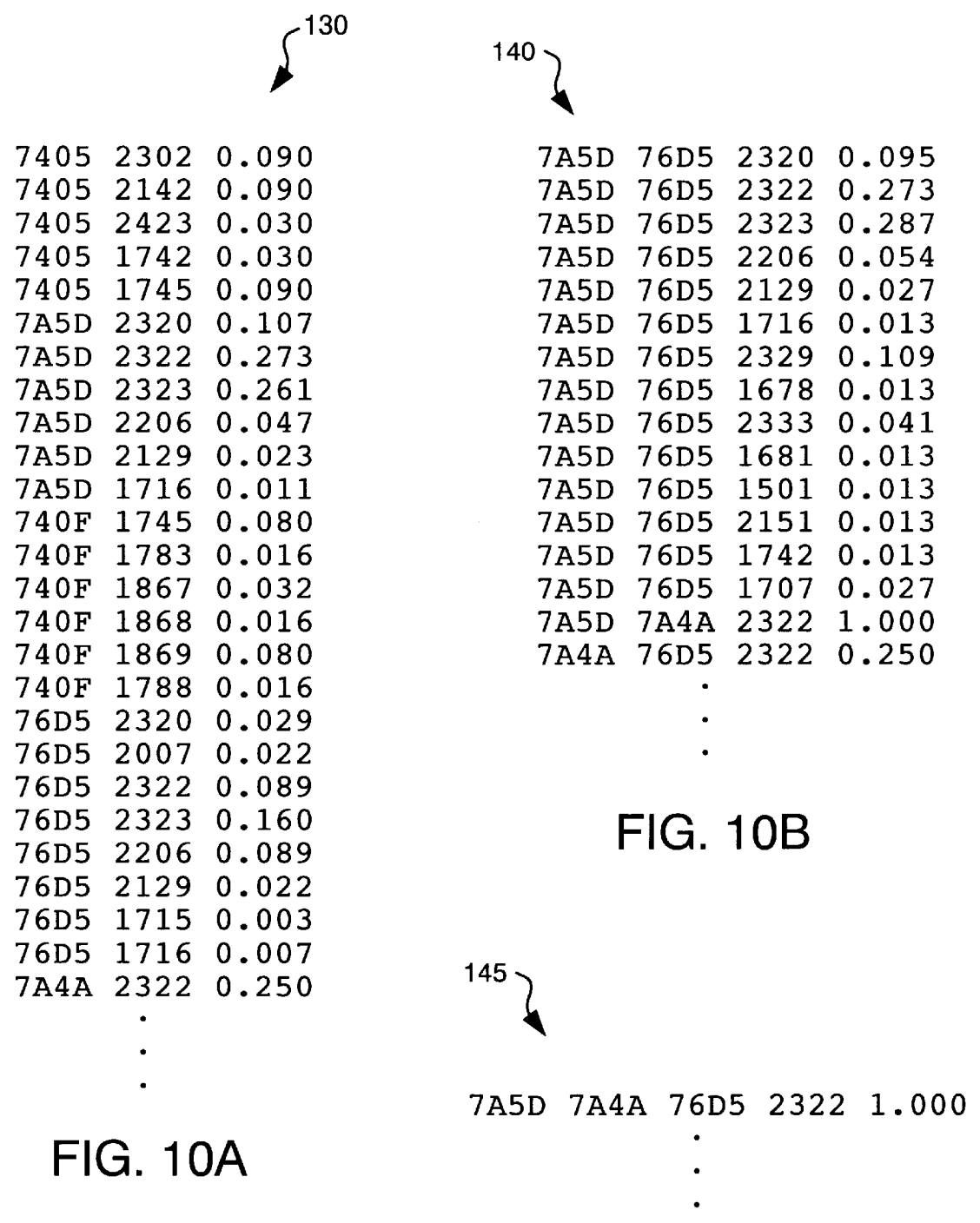

For example, FIG. 10A illustrates a portion 130 of the weighted repair and single distinct fault cluster combinations. As shown in FIG. 10A, repair code 2322 and single fault cluster or fault code 7A5D combination has a weight of 0.27 or 27% (e.g., $23/84$), repair code 2322 and single fault cluster or fault code 76D5 and has a weight of 0.09 or 9% (e.g., $24/268$), repair code 2322 and single fault cluster or fault code 7A4A has a weight of 0.25 or 25% (e.g., $1/4$).

FIG. 10B illustrates a portion 140 of the weighted repair and double distinct fault cluster combinations. As shown in FIG. 10B, repair code 2322 and double fault cluster or fault codes 7A5D and 76D5 combination has a weight of 0.27 or 27% (e.g., $20/73$), repair code 2322 and double fault cluster or fault codes 7A5D and 7A4A has a weight of 1.0 or 100% (e.g., $1/1$), and repair code 2322 and double fault cluster or fault codes 7A4A and 76D5 has a weight of 0.25 or 25% (e.g., $1/4$).

FIG. 10C illustrates a portion 145 of the weighted repair and triple distinct fault cluster combination. As shown in FIG. 10C, repair code 2322 and triple fault cluster or fault codes 7A5D, 7A4A, and 76D5 has a weight of 1.0 or 100% (e.g., $1/1$).

For cases having distinct faults numbering greater than three (e.g., n), additional directed weights for fault clusters of four, five, . . . , n, (not shown) are generated.

Once the weighted repair and distinct fault cluster combinations are determined, they can be used to analyze a malfunctioning machine in a number of ways. For example, distinct fault clusters can be generated from new fault log data 200 (FIG. 1) from a malfunctioning locomotive and readily compared, manually or automatically, to weighted repair and distinct fault cluster combinations for prediction of one or more repairs as disclosed in greater detail in related U.S. patent application Ser. No. 09/285,611, entitled "Method and System For Analyzing Fault Log Data For Diagnostics," the subject matter of which is incorporated by reference herein in its entirety.

Figure 11:
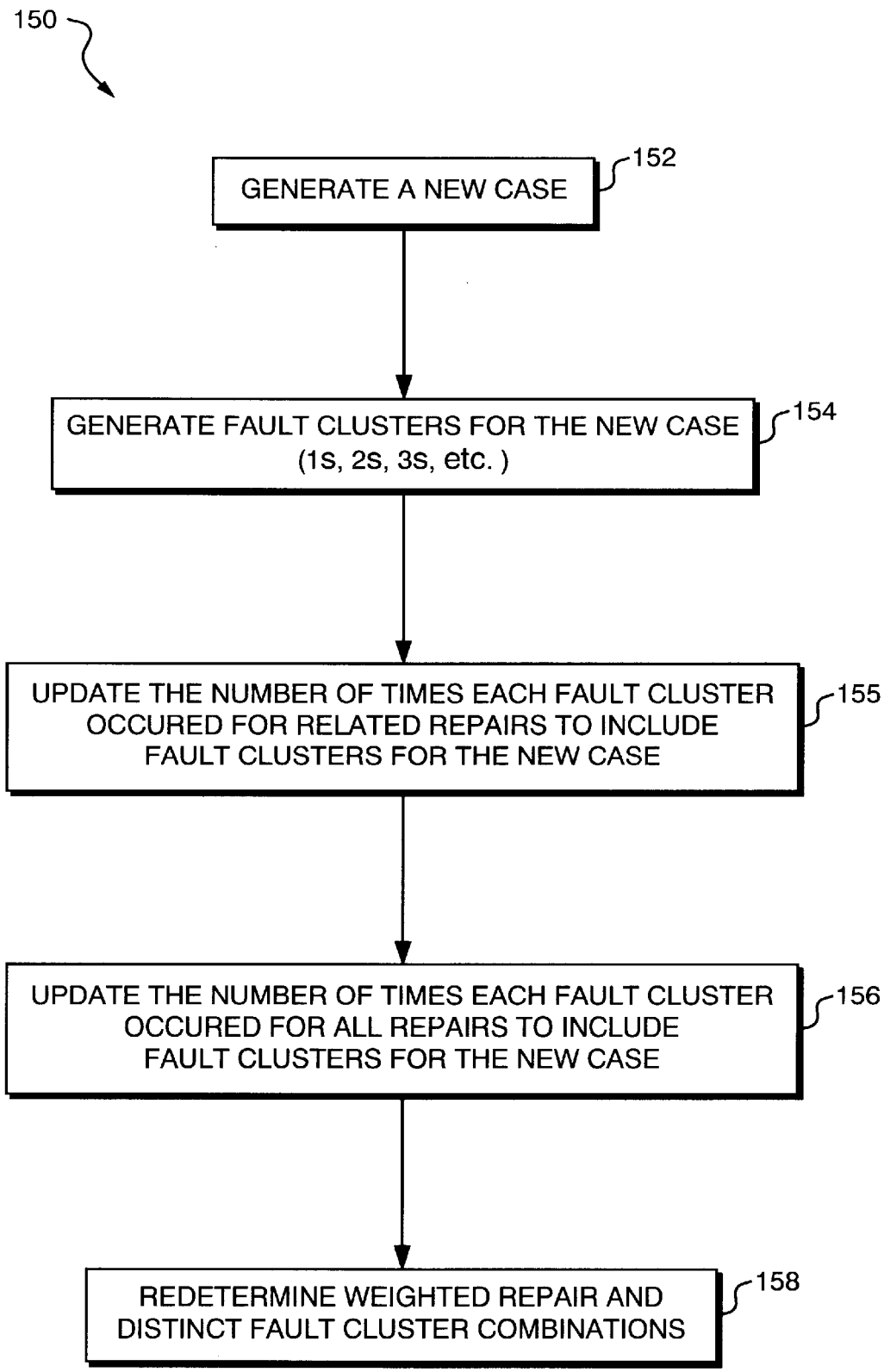
FIG. 11 is a flowchart describing the steps for adding a new case to the case database and updating the weighted repair and distinct fault cluster combinations.

As shown in FIG. 11, a process 150 of the present invention provides updating directed weight data storage unit 26 to include one or more new cases. For example, a new repair and fault log data 25 (FIG. 1) from a malfunctioning locomotive is received at 152. At 154, a plurality of repair and distinct fault cluster combinations for the plurality of the distinct fault is generated.

The number of times each fault cluster occurred for related repairs is updated at 155, and the number of times each fault cluster occurred for all repairs are updated at 156. Thereafter, the weighted repair and distinct fault cluster combinations are redetermined at 158.

As noted above, the system provides prediction of repairs from fault log data from a malfunctioning machine. Desirably, after verification of the repair(s) for correcting a malfunction the new case can be inputted and updated into the system.

From the present invention, it will be appreciated by those skilled in the art that the repair and fault cluster combinations may be generated and stored in memory when generating the weights therefor, or alternatively, be stored in either the case data storage unit, directed weight storage unit, or a separate data storage unit.

Thus, the present invention provides in one aspect a method and system for automatically harvesting potentially valid diagnostic cases by interleaving repair and fault log data which is not restricted to sequential occurrences of faults or error log entries. In another aspect, standard diagnostic fault clusters can be generated in advance so they can be identified across all cases and their relative occurrence tracked. In still another aspect, the calibration of the significance of repair and distinct fault cluster combinations based upon cases of related repairs and cases for all the repairs is determined.

In addition, when initially setting up case data storage unit 24, a field engineer may review each of the plurality of cases to determine whether the distinct faults, and in particular, number of times the distinct faults occur, provide a good indication of the repair. If not, one or more cases can be excluded or removed from case data storage unit 24. This review by a field engineer would increase the initial accuracy of the system in assigning weights to the repair and fault cluster combinations.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for processing repair data comprising a plurality of repairs and fault log data comprising a plurality of faults from one or more machines to facilitate analysis of a malfunctioning machine, comprising:
   generating a plurality of cases from the repair data and the fault log data, each case comprising a repair and a plurality of distinct faults;
   generating, for each of the plurality of cases, at least one repair and distinct fault cluster combination; and
   assigning, to each of the repair and distinct fault cluster combinations, a weight, whereby weighted repair and distinct fault cluster combinations facilitate prediction of at least one repair for the malfunctioning machine.

2. The method of claim 1 wherein the at least one repair and distinct fault cluster combination comprises a repair and at least one of a single distinct fault and a plurality of distinct faults.

3. The method of claim 1 wherein the at least one repair and distinct fault cluster combination comprises a repair and a plurality of distinct faults.

4. The method of claim 1 wherein the generating the plurality of cases comprises selecting a repair from the repair data and selecting a plurality of distinct faults from the fault log data over a period of time prior to the repair.

5. The method of claim 4 wherein the generating the plurality of cases comprises determining the number of times each of the plurality of distinct faults occurs over the period of time.

6. The method of claim 1 wherein the assigning weights comprises determining, for each repair and distinct fault cluster combination, a number of times the combination occurs in cases comprising related repairs, and a number of times the combination occurs in the plurality of cases.

7. The method of claim 6 wherein the assigning a weight, for each repair and distinct fault cluster combination, comprises dividing is the number of times the combination occurs in cases comprising related repairs by the number of times the combination occurs in the plurality of cases.

8. The method of claim 1 further comprising;
   generating a new case from repair data and fault log data, the case comprising a repair and a plurality of distinct faults;
   generating, for the new case, a plurality of fault clusters for the plurality of distinct faults; and
   redetermining a weight for each of the plurality of repair and fault clusters combinations to include the new case.

9. A system for processing repair data comprising a plurality of repairs and fault log data comprising a plurality of faults from one or more machines to facilitate analysis of a malfunctioning machine, comprising:
   means for generating a plurality of cases from the repair data and the fault log data, each case comprising a repair and a plurality of distinct faults;
   means for generating, for each of the plurality of cases, at least one repair and distinct fault cluster combination; and
   means for assigning, to each of the repair and distinct fault cluster combinations, a weight, whereby weighted repair and distinct fault cluster combinations facilitate prediction of at least one repair for the malfunctioning machine.

10. The system of claim 9 wherein the at least one repair and distinct fault cluster combination comprises a repair and at least one of a single distinct fault and a plurality of distinct faults.

11. The system of claim 9 wherein the at least one repair and distinct fault cluster combination comprises a repair and a plurality of distinct faults.

12. The system of claim 9 wherein the means for generating the plurality of cases comprises means for selecting a repair from the repair data and selecting a plurality of distinct faults from the fault log data over a period of time prior to the repair.

13. The system of claim 12 wherein the means for generating the plurality of cases comprises means for determining the number of times each of the plurality of distinct faults occurs over the period of time.

14. The system of claim 9 wherein the means for assigning weights comprises means for determining, for each repair and distinct fault cluster combination, a number of times the combination occurs in cases comprising related repairs, and a number of times the combination occurs in the plurality of cases.

15. The system of claim 14 wherein the means for assigning a weight, for each repair and distinct fault cluster combination, comprises means for dividing the number of times the combination occurs in cases comprising related repairs by the number of times the combination occurs in the plurality of cases.

16. The system of claim 14 further comprising;
   means for generating a new case from repair data and fault log data, the case comprising a repair and a plurality of distinct faults;
   means for generating, for the new case, a plurality of fault clusters for the plurality of distinct faults; and
   means for redetermining a weight or each of the plurality of repair and fault cluster combinations to include the new case.

17. A system for processing repair data comprising a plurality of repairs and fault log data comprising a plurality of faults from one or more machines to facilitate analysis of a malfunctioning machine, comprising:
   a repair log data storage unit adapted to store a plurality of repairs;
   a fault log data storage unit adapted to store a plurality of faults;
   a processor adapted to generate a plurality of cases from the repair data and the fault log data, each case comprising a repair and a plurality of distinct faults;
   the processor adapted to generate, for each of the plurality of cases, at least one repair and distinct fault cluster combination; and
   the processor adapted to assign, to each of the repair and distinct fault cluster combinations, a weight determined by dividing a number of times the combination occurs in cases comprising related repairs by a number of times the combination occurs in the plurality of cases, whereby weighted repair and distinct fault cluster combinations facilitate prediction of at least one repair for the malfunctioning machine.

18. An article of manufacture comprising:
   a computer program product comprising computer usable medium having computer readable program code means embodied therein for causing the processing of repair data comprising a plurality of repairs and fault log data comprising a plurality of faults from one or more machines to facilitate analysis of a malfunctioning machine, the computer readable program code means in said article of manufacture comprising:

computer readable program code means for causing a computer to generate a plurality of cases from the repair data and the fault log data, each case comprising a repair and a plurality of distinct faults;

computer readable program code means for causing a computer to generate, for each of the plurality of cases, at least one repair and distinct fault cluster combination; and computer readable program code means for causing a computer to assign, to each of the repair and distinct fault cluster combinations, a weight determined by dividing a number of times the combination occurs in cases comprising related repairs by a number of times the combination occurs in the plurality of cases, whereby weighted repair and distinct fault cluster combinations facilitate prediction of at least one repair for the malfunctioning machine.

\* \* \* \* \*